United States Patent Office 3,006,865
Patented Oct. 31, 1961

3,006,865
REFRACTORY COMPOSITION
Samuel Ruben, 52 Seacord Road, New Rochelle, N.Y.
No Drawing. Filed Nov. 10, 1958, Ser. No. 772,690
6 Claims. (Cl. 252—518)

This invention relates to a refractory material which in its various compositions is useful for fabrication into oxidation and temperature resistant structural parts, as an electrical resistor and for other applications.

A general object of the invention is to provide a material which is suitable for use in oxidizing atmospheres at high temperatures.

A further object is to provide an improved electrical resistor element.

Another object is the provision of a refractory electrically conductive material capable of operation and maintaining mechanical strength at high temperatures in an oxidizing atmosphere.

Another object is to provide a process for producing inert refractory compositions capable of operating at high temperatures in oxidizing atmospheres.

Other objects will be apparent from the disclosure.

In the past there has been a general recognition that molybdenum disilicide is a useful base material in the production of compositions capable of operating at high temperatures in oxidizing atmospheres and electrical resistance elements. However, no completely practical and low-cost method has been devised for the successful commercial utilization of molybdenum disilicide for these applications, nor, as far as I am aware, has any composition been heretofore devised to provide the required characteristics.

I have found that molybdenum disilicide, when reacted with vanadium pentoxide, provides a new material which is useful as a refractory electrically conductive material capable of operation at high temperatures in an oxidizing atmosphere and of maintaining its structural strength under such conditions. The characteristics of the new composition are such that it provides a useful electrical resistance element.

In the process of producing the new material, molybdenum disilicide and vanadium pentoxide are ground to a fine powder and are then heated to the melting point (690° C.) of vanadium pentoxide which melts and flows through the mass. The mixture is then heated to a high temperature, such as 1000° C. During the process the vanadium pentoxide reacts with the molybdenum disilicide, probably with the silicon dioxide layer which may be formed on the surface of the molybdenum disilicide when heated. The final product is a hard well-bonded mass in which the low temperature melting characteristics of the vanadium pentoxide are absent and which can be repeatedly heated to high temperatures without loss of its mechanical or structural properties or its electrical conductivity.

The proportion of vanadium pentoxide used in respect to the molybdenum disilicide is dependent upon the desired mechanical and electrical characteristics and may be in the range of 2% to 25% of vanadium pentoxide. For most applications, a proportion of 5% vanadium pentoxide to the weight of the combined materials is adequate to provide a solid refractory bond.

For most purposes, I prefer to use the chemically pure anhydrous grade of vanadium pentoxide. In the production of rods formed from the molybdenum disilicide/vanadium pentoxide compositions, the materials may be compressed at a pressure of 10,000 lbs. per square inch into the desired shapes. If desired, various volatile binders common in the art of fabricating pressed powder articles may be employed to provide desired strength and shape, and other non-deleterious metals or compounds may be added in minor proportions.

The compositions may be used to provide parts for jet engines, missiles, high temperature corrosion resistant vessels, electrical resistors, etc.

I claim:

1. A pressed powder composition consisting essentially of 2% to 25% by weight of vanadium pentoxide and the balance molybdenum disilicide, said composition being the reaction product of heating vanadium pentoxide and molybdenum disilicide at temperatures at least equaling the melting point of vanadium pentoxide.

2. A composition of matter suitable for use and resistant to oxidation at high temperatures consisting essentially of 2% to 25% by weight of vanadium pentoxide and 98% to 75% by weight of molybdenum disilicide, said composition being the reaction product of heating the mixture of vanadium pentoxide and molybdenum disilicide powders first to the melting point of vanadium pentoxide and thereafter to a substantially higher temperature.

3. An electrically conducting oxidation-resistant pressed and sintered refractory compact consisting essentially of 2% to 25% by weight of vanadium pentoxide and 98% to 75% by weight of molybdenum disilicide, said compact being the reaction product of heating a pressed mixture of the constituent powders to about 690° C. and thereafter to a temperature in the order of 1000° C.

4. The method of making a composition suitable for use as a high temperature oxidation-resistant element which comprises mixing vanadium pentoxide and molybdenum disilicide particles, said molybdenum disilicide particles constituting at least 75% and not more than 98% by weight of the mixture, and heating the mixture to a temperature at least equaling the melting point of vanadium pentoxide.

5. The method of making refractory compositions which comprises mixing together 2% to 25% by weight of finely divided vanadium pentoxide particles and 98% to 75% by weight of finely divided molybdenum disilicide particles, first heating the mixture to a temperature in the order of 690° C., and thereafter heating the mixture to a substantially higher temperature.

6. The method of making electrically conductive refractory compositions which comprises mixing together 2% to 25% by weight of finely divided vanadium pentoxide particles and 98% to 75% by weight of finely divided molybdenum disilicide particles, pressing compacts from the mixture, heating said compacts to a temperature at which the vanadium pentoxide melts, and thereafter heating said compacts to a temperature at least in the order of 1000° C.

References Cited in the file of this patent

UNITED STATES PATENTS

| | | |
|---|---|---|
| 2,247,036 | Ruben | June 24, 1941 |
| 2,311,918 | Wainer et al. | Feb. 23, 1943 |
| 2,622,304 | Coffer | Dec. 23, 1952 |
| 2,745,928 | Glaser | May 15, 1956 |